No. 717,584.  
H. W. LEONARD.  
METHOD OF CONTROLLING THE SUPPLY OF ELECTRIC ENERGY TO TRANSLATING DEVICES.  
APPLICATION FILED FEB. 6, 1897.  
PATENTED JAN. 6, 1903.  
NO MODEL.  
3 SHEETS—SHEET 1.
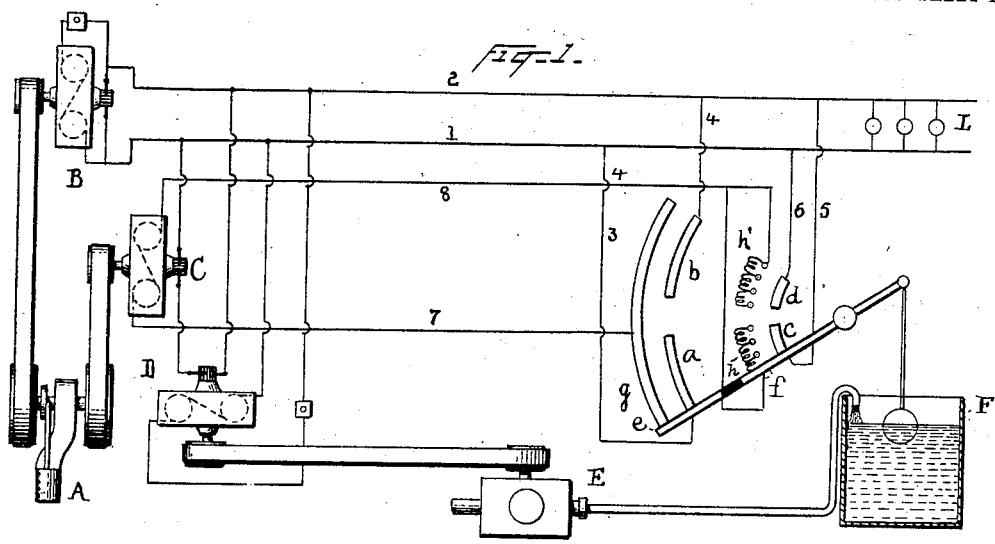
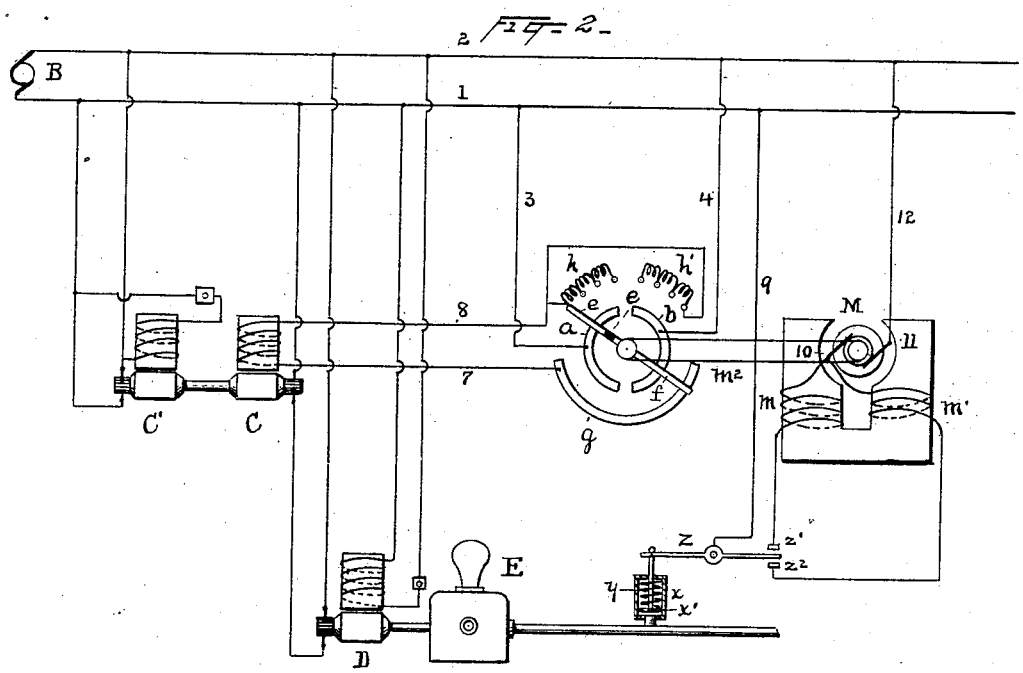
Witnesses  
Inventor

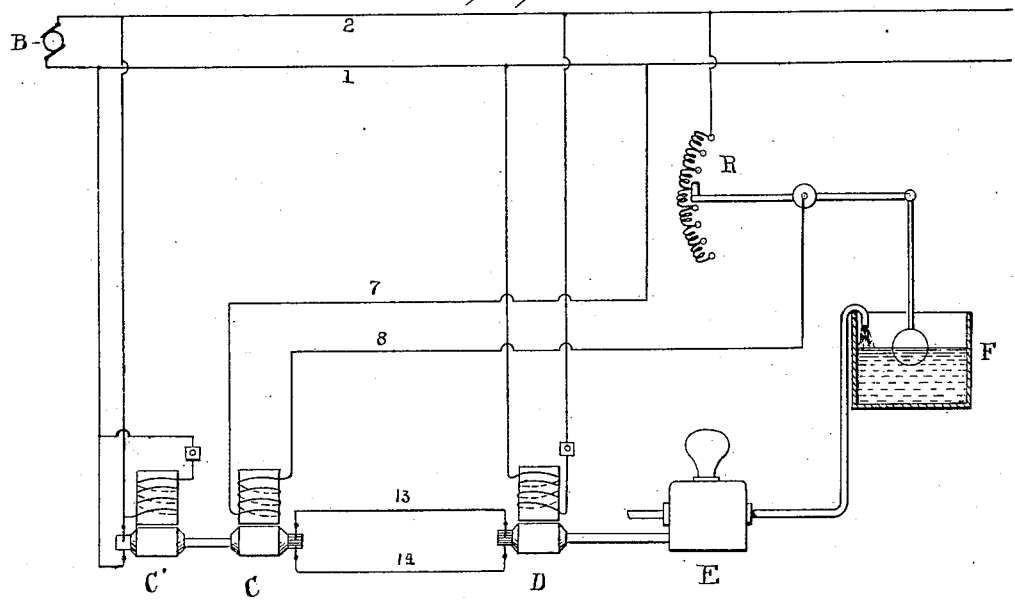
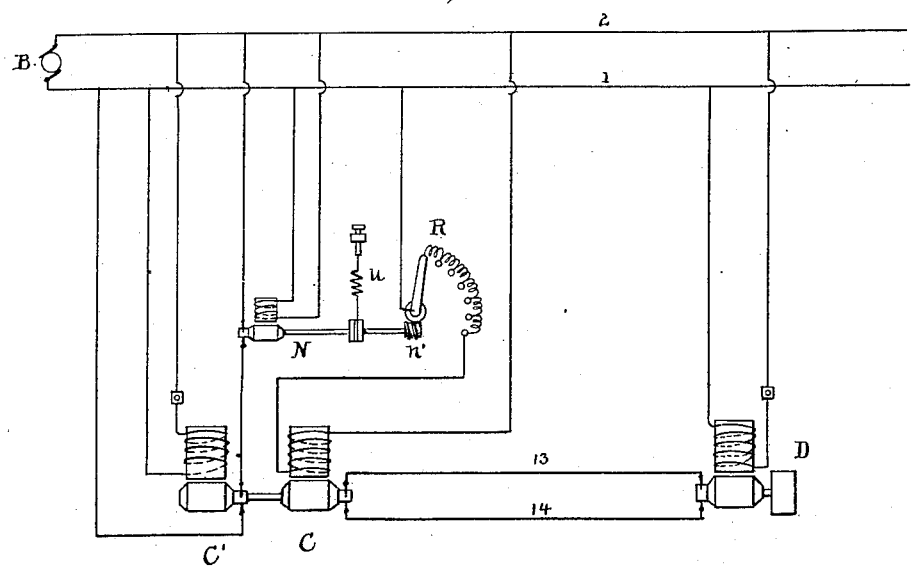

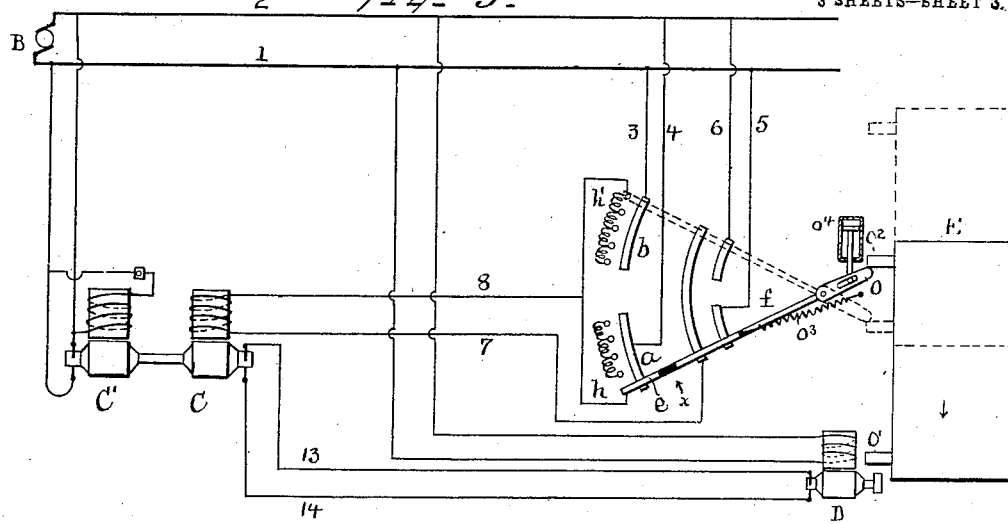

UNITED STATES PATENT OFFICE.

HARRY WARD LEONARD, OF EAST ORANGE, NEW JERSEY.

METHOD OF CONTROLLING THE SUPPLY OF ELECTRIC ENERGY TO TRANSLATING DEVICES.

SPECIFICATION forming part of Letters Patent No. 717,584, dated January 6, 1903.

Application filed February 6, 1897. Serial No. 622,269. (No model.)

*To all whom it may concern:*

Be it known that I, HARRY WARD LEONARD, a citizen of the United States, residing at East Orange, in the county of Essex and State of New Jersey, have invented a certain new and useful Improvement in the Method of Controlling the Supply of Electric Energy to Translating Devices, of which the following is a specification.

My invention relates to the control of electric motors, and especially to the automatic control of electric motors in such a way that the motor will automatically operate to do just the amount of work required of it when the amount of work to be done is variable, as in the case of pumping water, compressing air, &c.

It is frequently important that a pump be operated so as to maintain a certain level of water, as in the draining of mines. The amount of water flowing into the mine is of course variable and beyond control. By my invention an electric motor operating a pump will automatically pump at just the speed required to maintain the level of the water constant regardless of the rate of inflow.

In a water-supply system it is important that the pumping machinery shall maintain a constant pressure on the mains, and in the use of compressed air it is desirable that the air shall be maintained at a constant pressure independent of the demand. By my invention this is automatically accomplished in a very simple manner.

In the operation of certain machinery it is desirable that means be provided which will automatically protect the same from being exposed to excessive strains. This can be readily accomplished by the use of my invention.

My invention is also applicable to the operation, from a source of power having a tolerably constant amount of energy at a tolerably constant speed, of machinery the torque element of the power of which may vary very widely, such as hoists, pumps, locomotives, &c.

With my invention I may use a prime motor not very steady as to speed and secure constant speed at final motor by driving a centrifugal governor by the final motor, which governor will be the automatic regulator.

In carrying my invention into effect I employ any well-known form of automatic device—such as a float, a centrifugal governor, a diaphragm or plunger operated by air, gas, or water, &c.—to adjust a rheostat connected in the field-circuit of a dynamo-electric machine which supplies a part or all of the energy for the working motor to be controlled—that is to say, instead of regulating the working motor directly I regulate its source of energy. In other words, I automatically cause to be varied the net effective volts delivered to the working motor to such a voltage as will operate the motor at the speed required.

In the accompanying drawings, which illustrate my invention, Figure 1 is a diagram of a pumping system operating in conjunction with an isolated electric-lighting plant. In this figure, A indicates a steam-engine or other prime mover driving dynamo-electric machines B and C. Conductors 1 and 2 extend from the machine B, between which are connected incandescent electric lamps L. The armature of the dynamo C is connected across the circuit 1 2 in series with the armature of a working motor D. The dynamo C has a separately-excited, variable, and reversible field connected across the circuit 1 2 through an automatic reversing-rheostat, the details of which will be hereinafter referred to. The field-circuit of the working motor D is a practically constant one connected across the circuit 1 2. Thus it will be seen that by connecting the armature of the working motor across the circuit 1 2 in series with a dynamo whose field is variable and reversible the working motor may be operated at any speed from zero to a speed due to the sum of the electromotive forces of machines B and C, the electromotive forces of said machines being practically equal—that is to say, if the machines B and C are both one-hundred-volt machines and both are producing their maximum electromotive force, and if the electromotive force of machine C is counter to that of machine B the working motor will receive no energy and will remain at rest. Now if the field of C be weakened, thus reducing the electromotive force produced by that machine, the working motor will receive energy due to the difference between the electromotive forces of B and C. The energy so delivered to the working motor may be increased by decreasing the strength of the field of machine C until that machine is producing practically no electromotive force, and then by reversing the field of that machine it will generate an electromotive force in the same direction as that of machine B, and the working motor will receive an electromotive force equal to the sum of the electromotive force of machines B and C, and this electromotive force can be further increased by increasing the strength of the field of machine C, thus increasing the electromotive force produced thereby and increasing the speed of the working motor until the working motor receives the full electromotive force of the machines B and C. The working motor drives a pump E, whose outlet leads to a reservoir F, the water in which must be maintained at a certain level. A float in the reservoir may be employed to automatically control the reversing-rheostat for the dynamo C, which rheostat may be of any desirable form. As shown, it comprises contact-plates $a$ and $b$, from which extend conductors 3 and 4, respectively, to the conductors 1 2; contact-plates $c$ and $d$, also connected with conductors 1 2 by wires 5 and 6, respectively; a pivoted contact-arm connected with the float and having two conducting-surfaces $e$ and $f$, insulted from each other; a contact-plate $g$ and resistances $h$ and $h'$, connected with the conductors 7 and 8, respectively, which extend from the field-magnet coils of machine C. The position of the float and the automatic rheostat is that when the water in the reservoir is at the desired level—that is, the entire resistance $h$ being cut out of the field-circuit of machine C, which machine then has a strong field and is generating its maximum electromotive force, and assuming that this electromotive force is equal and opposite to that of machine B the working motor will receive no energy. When the water in the reservoir falls below the desired level, the float descends and moves the contact-plates $e$ and $f$ upward, inserting a resistance in the field-circuit of the machine C, thus weakening the field of that machine and gradually reducing its electromotive force, and hence the armature of the working motor will receive an amount of energy from the main line 1 2 due to the difference between the electromotive forces produced by the machines B and C. If the float continues to descend, the contact-arms $e$ and $f$ will continue to rise, inserting more resistance in the field-circuit of machine C, and hence increasing the energy delivered to the working motor. If the water in the reservoir falls low enough to cause the float to carry the contacts $e$ and $f$ beyond the horizontal line, so that the plate $e$ will bridge the plates $g$ and $b$ and the plate $f$ will bridge the resistance $h'$ and plate $d$, the field-circuit of the machine C will be reversed, but with a weak field, so that a small electromotive force will be generated by machine C in the same direction as that from the machine B. Thus the armature of the working motor will receive an amount of energy equal to the sum of the electromotive forces of the machines B and C, and which amount of energy can be increased by strengthening the field of machine C. Thus it will be seen that the speed of the motor D may be gradually and automatically increased, according to the fall of the water in the reservoir, and when the water in the reservoir begins to rise the reverse action will take place and continue until the water reaches the desired level, when the automatic rheostat will be returned to its normal position and the working motor will receive no energy.

Fig. 2 illustrates a modified arrangement of apparatus. In this figure the dynamo C is driven by a motor C' instead of by the prime mover A, as in Fig. 1. The motor C' may be a shunt-wound motor connected across the circuit 1 2. The relative arrangement of the machines C and D is the same as in Fig. 1; but the automatic regulator is somewhat different, as will be presently pointed out. The apparatus E in this figure may be a pump for a water system in which a certain pressure must be maintained, or it may be an air-compressor or any similar apparatus. The outlet-pipe from E communicates with a chamber $x$, within which may be a diaphragm, a plunger, or similar device $x'$ against which is seated a spring $y$, the tension of which is regulated to counterbalance a certain pressure in the outlet-pipe from the apparatus E. The plunger or similar device $x'$ is connected with a pivoted circuit-controller $z$, which plays between two contacts $z'$ and $z^2$. When the spring $y$ and the pressure in the outlet-pipe counterbalance each other, the contact $z$ will assume a normal position between the two contacts $z'$ and $z^2$, but not in contact therewith. The pivoted contact $z$ is connected with the main conductor 1 by a conductor 9, the contact $z'$ is connected with the field-coil $m$ of a small motor M, and the contact $z^2$ is connected with the field-coil $m'$ of the motor M, and both the field-coils $m$ and $m'$ are connected with the brush 10 of the motor, and the brush 11 is connected by wire 12 to the main conductor 2. The field-coils $m$ and $m'$ are wound so as to produce a field magnetism in opposite directions, according to which of the coils are connected in circuit. The object of this arrangement is to cause the armature of the motor M to run in opposite directions, according to the rise and fall of the pressure in the outlet-pipe from the apparatus E—that is to say, if the pressure becomes too great the piston $x'$ will be raised and the lever $z$ will make contact with the plate $z^2$, placing the field-coil $m'$ in circuit, whereas if the pressure falls below a certain point the spring $y$ will overbalance the pressure in the outlet-pipe and force the piston $x'$ downward, causing the lever $z$ to make contact with the contact-plate $z'$ and place the field-coil $m$ in circuit. This reversal of the connections reverses the field magnetism of the motor M, and hence reverses the direction of rotation of its armature. The motor M is a very small one and is employed solely to operate the field regulating and reversing switch for the dynamo C. In this switch, which is practically the same as that of Fig. 1, the plate $g$ is connected by wire 7 with the field-coils, and the resistances $h$ and $h'$ are connected with the field-coil of the machine C by the wire 8. The contact-plates $a$ and $b$ are connected with the conductors 1 2 by wires 3 and 4, respectively. The position of the switch as indicated in the drawings is similar to that of Fig. 1, and upon a decrease in the pressure in the outlet-pipe the pivoted contact $z$ will make contact with the plate $z'$, which will start the motor M in operation and move the contact-arms $e$ and $f$ toward the right and left, respectively, increasing the resistance in the field-circuit of the machine C, with the results above indicated. The armature of the motor M may be connected by any suitable means with the contact-arms $e$ and $f$, a belt $m^2$ being shown for this purpose.

Fig. 3 shows another modification of my invention. In this arrangement the dynamo C is driven by a motor C', as in Fig. 2; but the armatures of the machine C and working motor D are in a local circuit 13 14. By this arrangement the armature of the working motor receives energy only from the machine C. The field-coils of the machine C are connected by wires 7 8 across the main circuit 1 2 through a simple rheostat R, controlled automatically by a float in a reservoir F, as in Fig. 1. The contact-lever of the rheostat is at an intermediate position, and the motor D is operating at an intermediate speed.

Fig. 4 shows another modification of my invention. In this figure 1 2 is the main line, and B the generator, as before, and C is the dynamo driven by motor C', as in Fig. 2. The armatures of the machine C and working motor D are connected in a local circuit 13 14, as in Fig. 3, although the armatures of these two machines may be connected in series across the main line 1 2, as in Figs. 1 and 2. The field of the machine C is regulated by a rheostat operated by a very small machine N, whose armature is of low voltage and whose field is wound to be connected across the circuit 1 2. The current for the armature of machine C' passes through the armature of machine N, producing a torque balanced by a spring or other suitable device $n$. The shaft of the armature of motor N is provided with a worm $n'$, which meshes with a worm-wheel on the spindle of the contact-lever of the rheostat R, whereby the rheostat is adjusted by the torque of the armature of N. If the current to machine C' becomes too large, the torque of machine N causes its shaft to revolve and lowers the volts of the energy in the working-motor circuit by adjusting the rheostat R in the field-circuit of machine C. When the current to machine C' falls, the spring connected with the armature-shaft of N causes the shaft to rotate in the opposite direction, thereby readjusting the rheostat to raise the volts of the working-motor circuit. This arrangement is useful with working motors whose load varies and where it is desirable to always take approximately the same amount of energy from the line. With this arrangement applied to an electric locomotive, for instance, the locomotive will travel fast on a level and slow on grades while using the same energy from the line.

Fig. 5 shows the application of my invention to the operation of tools or machinery, the connections being the same as in Fig. 3, except that a reversing-rheostat is employed. In this illustration the working motor D is designed to operate the table E of a planing-machine, and in order to produce the reciprocating movement of the table the direction of rotation of the motor-armature is reversed by automatically reversing the field magnetism of the machine C. This I accomplish by providing for the field-circuit of the motor a reversing-rheostat like that shown in Fig. 1. The pivoted contact-lever of the rheostat is actuated by the engagement of the end $o$ of the lever with lugs $o'$ $o^2$, projecting from the table E. The rheostat-lever is provided with a spring $o^3$, which when the lever is moved over the dead-center by the movement of the table throws the lever to the opposite position. The illustration indicates the table as moving in the direction of the arrow and the lug $o^2$ just engaging the end $o$ of the rheostat-lever. This engagement takes place when the table has very nearly reached the end of its movement in one direction. As the table continues to move in the direction of the arrow the contact-lever is moved in the direction of the arrow $x$, and when it is carried over the central position the spring $o^3$ throws the lever to the dotted position. The field magnetism of the machine C being now reversed, the direction of rotation of the motor-armature will reverse and the table E will move in the opposite direction. When the table reaches the dotted position, the lug $o'$ will engage the lever $o$ and start the lever in the opposite direction, as will be well understood. Thus the direction of rotation of the motor-armature is automatically and periodically reversed to produce a reciprocating motion. I have shown a dash-pot $o^4$ for retarding the movement of the rheostat-lever when thrown by the spring, so that the time required for fully reversing the switch can be varied, if desired.

Fig. 6 illustrates the application of the system of Figs. 1 and 2 to the operation of tools or apparatus in which the driven part is moved alternately in opposite directions at a constant or full speed, although the controlling apparatus may be arranged to cause the driven part to move at a variable speed. As in Fig. 2, the regulating-machine C is driven by motor C', and the working motor D and machine C are connected in series across the line 1 2, so that motor D can be driven at speeds varying from zero to a full speed, due to the sum of the electromotive forces of the machines B and C. In the illustration the working motor D is driving the part E at full speed in the direction of the arrow—that is, there is no resistance in the field-circuit of machine C, and its field-magnet is such that the electromotive force of that machine assists the electromotive force of machine B in driving the working motor. In the practical operation of machinery by this method I prefer to so arrange machine C that its electromotive force will be slightly less than that of the source, so that the line electromotive force cannot be balanced thereby and the machinery brought to rest by the operation of the automatic controlling mechanism. The movable part E in the illustration is just engaging the end $o$ of the controlling-lever $f$, and the continued movement of E moves lever $f$ in the direction of arrow $x$, thus gradually weakening the field of machine C until it is producing practically no electromotive force, and the speed of motor D will be that due to the line electromotive force only. When the lever $f$ reaches the dotted-line position 2, the field magnetism of machine C is reversed and produces a low electromotive force counter to that of the line and the speed of D is further reduced, and when the lever $f$ reaches the dotted-line position 3 the machine C will produce its full electromotive force counter to that of the line, and the net electromotive force upon the terminals of motor D will be just about sufficient to carry E a slight distance forward to move lever $f$ over the dead-center and effect the reversal of reversing-switch S, which reverses the field connections of the working motor. This is accomplished by stud $s'$ engaging with switch-lever $s$. So soon as lever $f$ is moved over the dead-center spring $o^3$ will complete its movement to the dotted position 5, the movement being controlled by the dash-pot $o^4$. The reversal of switch S will cause the armature of D to rotate in the opposite direction, and as the lever $f$ moves to position 5 the armature will gradually run up to full speed, the movement of lever $f$ from position 3 being to gradually weaken the field of C until it is producing practically no electromotive force counter to that of the line, and at position 4 the field of C is reversed, producing a low electromotive force in the same direction as that of the line, and when position 5 is reached the machine C will produce its full electromotive force in the same direction as the line electromotive force, and the field magnetism of D being reversed E will move at full speed toward the dotted-line position. The lever $f$ being now in the dotted-line position 5 and the switch-lever $s$ being in its dotted-line position, studs $o'$ and $s^2$ will strike their respective levers, and the operation described will be repeated and E caused to again move in the direction of the arrow. It will be understood, of course, that the operation of the levers $f$ and $s$ will be quite rapid. It will also be noted that lever $s$ is thrown when there is only a very low electromotive force upon the armature-terminals of machine D.

What I claim is—

1. The method of controlling an electric motor, which consists in supplying the field of the motor from a main source of electromotive force, supplying its armature with a variable electromotive force controlled by a second source of electromotive force located between the motor-armature and the main source to vary the speed of rotation of said armature, and reversing the field magnetism of the motor to reverse the direction of rotation of said armature, substantially as set forth.

2. The method of controlling an electric motor, which consists in supplying the field of the motor from a main source of electromotive force, supplying its armature with a variable electromotive force controlled by a second source of electromotive force located between the motor-armature and the main source and producing a variable and reversible electromotive force to vary the speed of rotation of said armature, and reversing the field magnetism of the motor to reverse the direction of rotation of said armature, substantially as set forth.

3. The method of converting rotary motion into reciprocating motion, which consists in supplying the field-winding of a motor with current from a source, supplying the armature-winding with current from the same source in series with the current from a dynamo-electric machine whose field is variable and reversible, and automatically and periodically reversing the field connections of said dynamo-electric machine and said motor, substantially as set forth.

4. The method of controlling an electric motor, which consists in supplying the field of the motor from a main source of electromotive force, supplying its armature with a variable electromotive force controlled by a second source of electromotive force located between the motor-armature and the main source to vary the speed of rotation of said armature, and automatically reversing the field magnetism of the motor to reverse the direction of rotation of said armature, substantially as set forth.

5. The method of controlling an electric motor, which consists in supplying the field of the motor from a main source of electromotive force, supplying its armature with a variable electromotive force controlled by a second source of electromotive force located between the motor-armature and the main source and producing a variable and reversible electromotive force to vary the speed of rotation of said armature, and automatically reversing the field magnetism of the motor to reverse the direction of rotation of said armature, substantially as set forth.

6. The method of controlling an electric motor, which consists in supplying the motor-armature with energy from two sources in series with each other, and automatically varying, independently of the current through the motor-armature, the electromotive force of one of said sources to automatically vary or control the speed of the motor, substantially as set forth.

7. The method of controlling an electric motor, which consists in supplying the motor armature with energy from two sources in series with each other, and automatically varying and reversing, independently of the current through the motor-armature, the electromotive force of one of said sources to automatically vary or control the speed of the motor, substantially as set forth.

8. The method of performing work automatically by an electric motor at varying rates to suit the requirements of a variable duty consisting in causing the work done by the motor to automatically vary the electromotive force in the armature-circuit of the motor from zero to the maximum electromotive force, so that the work done by the motor is automatically proportioned in its rate to the rate of work required.

9. The method of performing work automatically by an electric motor at varying rates to suit the requirements of a variable duty consisting in causing the work last performed by the motor to vary a speed-controlling electromotive force in the armature circuit of the motor from zero to the maximum electromotive force and thereby causing the motor to automatically perform work at the desired rate.

10. The method of automatically controlling the speed of an electric motor when the amount of work to be done by the motor is variable and uncontrollable, consisting in automatically controlling by means of the load upon the motor the generation from zero to the maximum electromotive force of a variable electromotive force in series with one element of the motor and thereby automatically operating the motor at a speed suited to the work to be done.

This specification signed and witnessed this 4th day of February, 1897.

H. WARD LEONARD.

Witnesses:
    EUGENE CONRAN,
    W. PELZER.